H. P. CURTRIGHT, DEC'D.
M. B. CURTRIGHT, ADMINISTRATRIX.
SULKY PLOW.
APPLICATION FILED MAY 3, 1909.
958,696.
Patented May 17, 1910.
2 SHEETS—SHEET 1.
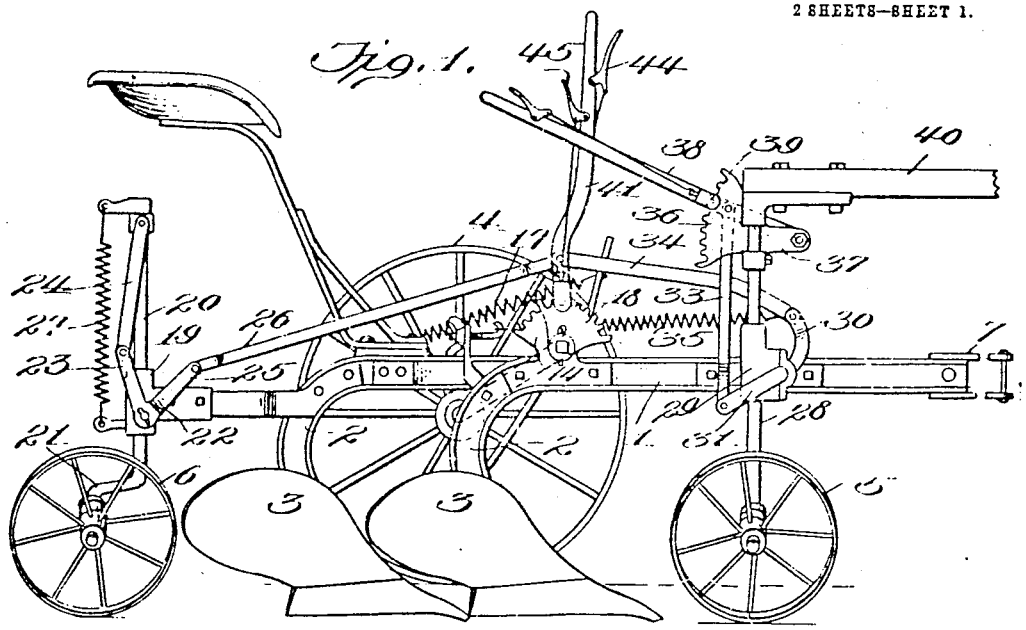
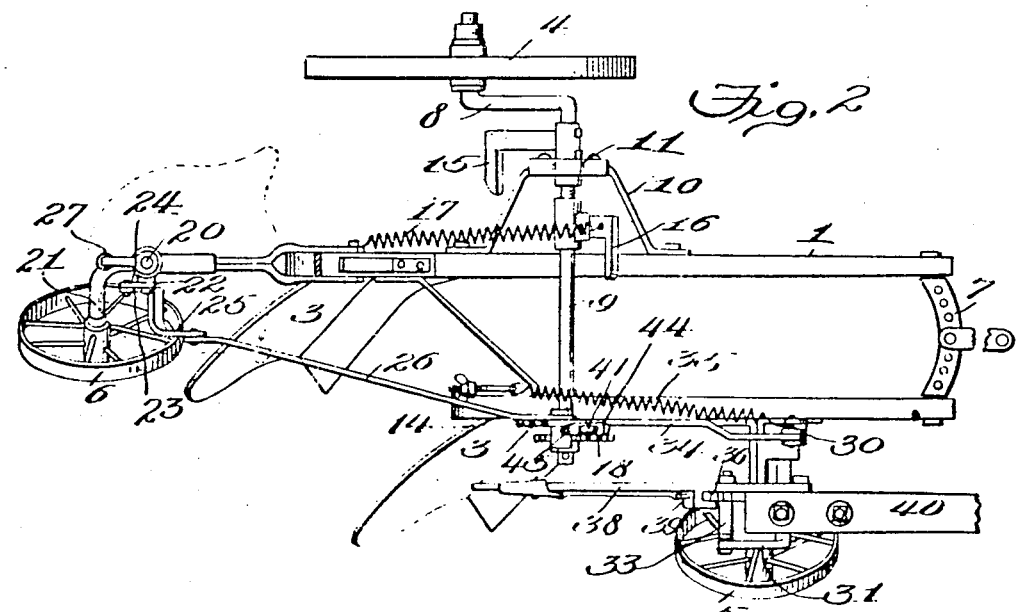

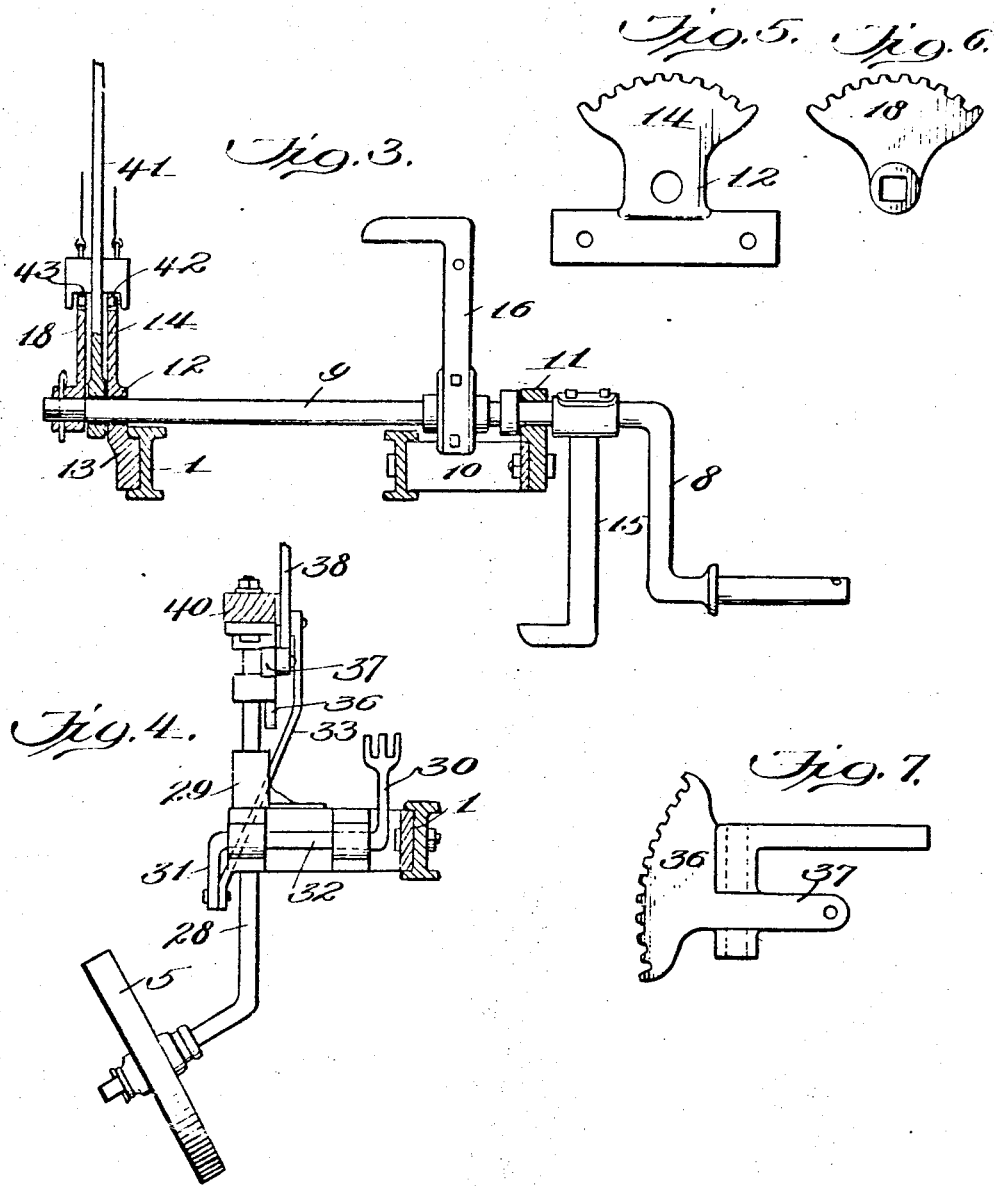

UNITED STATES PATENT OFFICE.

HARRY P. CURTRIGHT, OF HOLLIDAY, MISSOURI; MARY B. CURTRIGHT ADMINISTRATRIX OF SAID HARRY P. CURTRIGHT, DECEASED.

SULKY-PLOW.

958,696.  Specification of Letters Patent.  Patented May 17, 1910.

Application filed May 3, 1909. Serial No. 493,659.

*To all whom it may concern:*

Be it known that I, HARRY P. CURTRIGHT, a citizen of the United States, residing at Holliday, in the county of Monroe and State of Missouri, have invented new and useful Improvements in Sulky-Plows, of which the following is a specification.

My present invention relates to improvements in plows, harrows and other agricultural implements of the type embodying a sulky or wheeled frame whereby the plow or other tool may be properly guided and supported while operating on the soil and whenever desirable the plow or other tool may be lifted clear of the ground, thereby enabling the implement to be readily transported, and it has for its object primarily to provide an improved apparatus of this class whereby the frame supporting or carrying the plow or other tool may with the greatest facility be bodily lowered or elevated in order to set the plow or tool in operative and inoperative positions with respect to the ground, and also the land and furrow sides of the frame are capable of independent elevation or depression as may be desirable or necessary, and moreover, in the present instance wherein the front and rear ends of the frame are movable vertically with respect to their supporting wheels, means is provided for varying the elevation of the front with respect to the rear of the frame.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a side elevation of a sulky plow constructed in accordance with my present invention, the plows being shown in this instance as lowered; Fig. 2 is a top plan view of the plow shown in Fig. 1; Fig. 3 is a detail sectional view of the shaft which supports the land side wheel, the treadles which operate the shaft, and the lever and related devices which operatively connect the shaft of the land side wheel to the devices which control the elevation of the furrow side and rear of the frame; Fig. 4 is a detail sectional view of the furrow wheel showing the operating connections between its standard and the furrow side of the frame; Fig. 5 is a detail view of the sector for locking the controlling lever in its different adjusted positions; Fig. 6 is a detail view of the sector which connects the controlling lever to the shaft for the land side wheel; and Fig. 7 is a detail view of the sector which forms an adjustable connection between the controlling lever and the standard of the furrow wheel, this view also showing the bracket which supports the tongue.

Similar parts are designated by the same reference characters in the several views.

The present invention is applicable generally to plows, harrows and other agricultural implements of the type embodying a wheeled carriage or sulky which serves to guide the plows or other tools and thus gage their depth as they pass through the soil and also to support them clear of the ground whenever it is desirable or necessary to transport the machine, for instance, from one field to another, and the present invention provides improved means for adjusting either the land side of the frame independently of the furrow side, the furrow side independently of the land side, and the front independently of the rear of the frame or the frame may be bodily adjusted by the operation preferably of a single lever or part.

In the drawing, I have shown one embodiment of the invention wherein the same is applied to a sulky plow. It will be understood, however, that I have shown but one embodiment of the invention as an example, and that certain modifications and changes may be made therein in order that the invention may be applied to the best advantage in each particular case.

In the present instance, the apparatus comprises generally a frame 1 having one or more plow standards 2 depending therefrom and carrying the plow shares 3, two plow shares forming a gang being shown in the present instance as an example. The frame is supported by a land wheel 4 and front and rear furrow wheels 5 and 6, and the forward end of the frame may be provided with a draft appliance 7 to which the horses or other draft means may be attached.

The land wheel 4 is, in the present instance journaled upon a crank 8 which is formed as a part of a transverse shaft 9, the latter being journaled in appropriate bearings upon the frame. In the present instance, a bracket 10 projects laterally from the land side of the frame and is provided with a bearing 11 in which the shaft 9 is journaled, and the opposite end of the shaft 9 is journaled in a bearing 12 formed by a bracket 13 which is bolted or otherwise secured to the furrow side of the frame, this bracket being provided with a notched or toothed sector 14 to serve a purpose to be hereinafter described. To the shaft 9 are fixed a pair of treadles 15 and 16, the treadle 15 being preferably arranged outside of the frame and at the land side and normally projecting downwardly below the plane of the frame while the treadle 16 preferably extends upwardly from the plane of the frame, these two treadles being arranged substantially in diametrically opposite relation and both are within convenient reach of the feet of the operator when seated upon the apparatus. The weight of the land side of the frame will, obviously, tend to depress it and in order to substantially balance the weight, a tension spring 17 may be attached at one end to the treadle 16 and at its opposite end to a stationary part of the frame. The shaft 9 may extend either below or above the frame, although it is generally preferable to arrange it above the plane of the frame in order to provide ample clearance. That end of the shaft 9 which extends to the furrow side of the frame is provided with a crank which in the present instance is in the form of a sector 18 which is fixed to turn with the said shaft, the end of the shaft for instance being angular so as to fit into a corresponding opening in the sector 18 and thereby produce a positive connection between them.

The rear portion of the frame is provided with a bracket 19 which has a square or other angular opening therein which extends vertically and forms a sliding fit with a standard 20 which preferably has a corresponding angular cross section and its lower end is appropriately bent and formed into a journal 21 on which the rear furrow wheel 6 is mounted. In order to vary the elevation of the rear part of the frame with respect to the ground, I provide in the present instance a bell-crank 22 which is pivoted at its intermediate point to the bracket 19, while one of its arms, the arm 23 in the present instance, is pivotally attached to a link 24, the latter in turn being pivotally connected to the upper portion of the standard 20. The other arm 25 of the bell-crank is pivotally connected to an operating rod 26 and in the present instance a pushing of the rod 26 toward the rear of the frame will, obviously, turn the bell-crank in a direction to pull the link 24 downwardly and thereby produce a lifting of the rear of the frame. In order to balance the weight of the rear portion of the frame, a tension spring 27 may be provided which as shown forms a connection between the upper end of the standard 20 and the rear portion of the frame.

The forward portion of the frame is supported by a forward furrow wheel which is journaled on the lower end of an appropriately formed standard 28, the latter being arranged substantially vertically in the present instance and is of angular cross section to form a sliding fit in a bracket 29 which is secured to the furrow side of the frame. In order to vary the elevation of the forward land side of the frame with respect to the ground, I provide a suitable operating connection between the forward furrow wheel 5 and the frame, this connection in the present instance consisting of a pair of reversely arranged cranks 30 and 31 which are connected by a shaft 32 journaled in bearings formed by the bracket 29, the crank 31 being pivotally connected to a link 33 which in turn is connected at its upper end to a part of the standard 28 while the crank 30 is connected to an operating rod 34. A tension of the rod 34 will obviously turn the cranks 30 and 31 in a direction to tension the link 33 whereby the forward furrow side of the frame will be elevated. The weight of the forward furrow side of the frame tends to depress it and in order to approximately balance the weight and thereby neutralize this tendency and facilitate the adjustment of the apparatus, a balancing spring 35 may be connected at one end to the crank 30 and at its opposite end to an appropriate stationary part of the frame. In the mechanism shown in the present instance for connecting the forward furrow wheel to the frame, I provide means which also enables the elevation of the forward furrow side of the frame with respect to the rear furrow portion thereof to be varied, such adjusting means consisting in the present instance of a bracket which is provided at one side with a toothed or notched sector 36 and at its opposite side with a forward arm 37, this bracket being fixed to the top of the standard 28 of the wheel 5, and the arm 37 forms a fulcrum for an adjusting lever 38, the link 33 being pivotally attached to this lever and the latter carries a dog 39 whereby the position of the frame with respect to the standard 28 at a given adjustment of the cranks 30 and 31, may be varied. The bracket which forms the sector 36 is in the present instance provided with a part which provides means for the attachment of the tongue 40.

The present invention provides means whereby an independent adjustment of either the land side or the furrow portions of the frame may be accomplished, and also the frame may be bodily elevated or depressed. I have shown in the present instance a single operating and controlling lever 41 which is capable of producing these results, this lever being loosely mounted at its lower end preferably on the shaft 9 as a fulcrum and it carries a pair of dogs 42 and 43 that are arranged at opposite sides thereof and are coöperative with the sectors 14 and 18, respectively, the dog 42 having a trip 44 while the dog 43 has a trip 45, both of these trips being preferably carried by the operating and controlling lever whereby they may be conveniently manipulated. The operating rods 26 and 34 which serve to actuate the adjusting means for the furrow portions of the frame are both pivotally connected to the lever 41 either at a point above or below the frame, they being shown connected above the frame in the present instance, such arrangement being generally preferable, as these rods when so connected do not interfere with the clearance space beneath the frame.

The frame may be bodily elevated and depressed by releasing the dog 42 by pressing the trip 44. As the lever 41 is connected to the shaft 9 carrying the land wheel through the sector 18 and dog 43, and as the same lever 41 is connected to the adjusting means which forms the operative connection between the front and rear furrow wheels and the frame, obviously a forward or rearward movement of the lever 41 will cause the frame to be bodily elevated or depressed according to the direction in which the lever is moved, a rearward movement of this lever toward the operator's seat being preferably used to elevate the frame for, by such an arrangement, the necessary effort to elevate the frame may be more conveniently applied, although the frame is counterbalanced more or less by the balancing springs. An independent adjustment of the forward furrow side of the frame may be accomplished by the lever 38, a lifting of this lever serving to increase the height of this portion of the frame while a downward movement of the same lever will depress the forward furrow side of the frame although normally this lever is locked in the desired adjusted position through the sector 36 and the dog 39.

The land side of the frame may be elevated or depressed independently of the furrow side of the frame, that is to say, while the adjusting means for the furrow side of the frame remains locked. This result may be accomplished by releasing the dog 43 by pressing the trip 45, while the dog 42 remains in locked engagement with the stationary sector 14. The releasing of the dog 43 permits the sector 18 to turn independently of the lever 41, and the operator by pressing upon the treadle 15 may elevate the land side of the frame, the weight of the frame, while the dog 43 is released serving to depress the land side of the frame, a relocking of the dog 43 with the sector 18 again connecting the various parts of the frame for simultaneous adjustment.

I claim as my invention:—

1. An agricultural implement comprising a frame to carry the ground engaging tools, front and rear furrow wheels and a land wheel, means for guiding the frame for rectilinear vertical movement with respect to said front and rear furrow wheels, and a common operating part carried by the frame and operatively connected to the front and rear furrow wheels and operative to elevate or lower the front and rear of the frame with respect to said furrow wheels.

2. An agricultural implement comprising a frame to carry the ground engaging tools, forward and rear furrow wheels and a land wheel, guides for insuring rectilinear vertical movement of the frame with respect to the forward and rear furrow wheels, operating devices connecting the said furrow wheels with their respective guides, and a common operating part connected to said operating devices for the forward and rear furrow wheels and operative to simultaneously elevate or depress the frame with respect to said forward and rear furrow wheels.

3. An agricultural implement comprising a frame to carry the ground engaging tools, front and rear furrow wheels and a land wheel, the frame being capable of vertical movement with respect to said wheels, a shaft connected to the land wheel, lifting devices for the front and rear furrow wheels, a common operating part having means for connecting and disconnecting it with respect to said shaft and to the lifting devices for the furrow wheels, means for locking the said part while the land wheel is disconnected therefrom, and means carried by said shaft for elevating or depressing the land side of the frame while said common operating part is locked.

4. An agricultural implement comprising a frame to carry the ground engaging tools, a land wheel, front and rear furrow wheels, said frame being capable of vertical movement with respect to all of said wheels, a shaft connected to the land wheel, a common operating lever connected to the two furrow wheels and having means for connecting and disconnecting it with respect to the said shaft for the land wheel, means for locking the common operating lever for movement while disconnected from said shaft, and means for turning said shaft to adjust the land side of the frame while said common operating lever is in locked condition.

5. An agricultural implement comprising a frame to carry the ground engaging tools, front and rear furrow wheels and a land wheel, said frame being capable of vertical movement with respect to all of said wheels, a common operating lever operatively connected to all of said wheels and capable of simultaneously elevating or lowering the frame bodily with respect thereto, and means for independently elevating or lowering a portion of the frame with respect to one of said furrow wheels.

6. An agricultural implement comprising a plow carrying frame, front and rear furrow wheels, a land wheel, a transverse shaft journaled on the frame and having a crank coöperative with the land wheel, the frame being capable of vertical movement with respect to said wheels, lifting devices connecting the front and rear furrow wheels to the frame, a common operating lever loosely mounted on said shaft and operatively connected to the said lifting devices for the front and rear furrow wheels, a sector fixed to said shaft, means carried by the said lever for connecting and disconnecting it with respect to said sector, and a treadle carried by said shaft whereby the land side of the frame may be elevated or depressed independently of the furrow side thereof.

7. An agricultural implement comprising a plow-carrying frame, a land wheel and forward and rear furrow wheels, the frame being capable of vertical movement with respect thereto, an operating lever connected to both furrow wheels, a cranked shaft connected to the land wheel, means for connecting and disconnecting said cranked shaft with respect to said operating lever, and means for locking said lever in different adjusted positions.

8. An agricultural implement comprising a plow-carrying frame, a land wheel and forward and rear furrow wheels, the frame being capable of vertical movement with respect thereto, an operating lever connected to both of said furrow wheels, a shaft connected to the land wheel, a sector rotatable with said shaft, and means carried by said lever and coöperative with said sector for adjustably and detachably connecting the lever to said shaft.

9. An agricultural implement comprising a plow-carrying frame, a land wheel and front and rear furrow wheels, the frame being movable vertically with respect to said wheels, a shaft carrying the land wheel, an operating lever connected to both of the furrow wheels, a sector rotatable with said shaft, a sector fixed with respect to said frame and independently operable devices carried by said lever for locking the same to either one or both of said sectors.

10. An agricultural implement comprising a plow-carrying frame, forward and rear furrow wheels and a land wheel, a crank shaft carrying the land wheel, devices for elevating the forward and rear portions of the frame with respect to the furrow wheels, a common operating lever connected to the devices for elevating the frame with respect to both of the furrow wheels, a sector fixed to said shaft, a stationary locking sector, and independently operable dogs carried by said lever for effecting either an independent or a simultaneous adjustment of the land and furrow sides of the frame.

11. An agricultural implement comprising a plow-carrying frame, a land wheel at one side thereof and front and rear furrow wheels, a crank shaft supporting the frame with respect to the land wheel, brackets on the frame for guiding the same for vertical movement with respect to the furrow wheels, said furrow wheels having standards slidable in said brackets, devices for elevating those portions of the frame carrying the brackets, springs for balancing the weight of the front and rear portions of the frame supported by the furrow wheels, a balancing spring for the land side of the frame, and a common controlling lever having means for connecting and disconnecting it with respect to the land wheel and permitting an independent adjustment of the land and furrow sides of the frame and also capable of bodily adjusting both sides of the frame.

In testimony whereof I have hereunto set my hand in presence of two subscribing witnesses.

HARRY P. CURTRIGHT.

Witnesses:
FRANK SNELL,
DAN. HILL.